(12) United States Patent
Ogunwumi et al.

(10) Patent No.: US 10,188,985 B2
(45) Date of Patent: *Jan. 29, 2019

(54) ZEOLITE AND REDOX OXIDE COMBINED CATALYST BODY

(71) Applicants: CORNING INCORPORATED, Corning, NY (US); DALIAN INSTITUTE OF CHEMICAL PHYSICS, CHINESE ACADEMY OF SCIENCES, Dalian, Liaoning (CN)

(72) Inventors: Steven Bolaji Ogunwumi, Painted Post, NY (US); Mallanagouda Dyamanagouda Patil, Corning, NY (US); Yuming Xie, Neward, CA (US); Hao Cheng, Dalian (CN); Shudong Wang, Dalian (CN)

(73) Assignees: Corning Incorporated, Corning, NY (US); Dalian Institute of Chemical Physics, Chinese Academy of Sciences, Dalian (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/348,415

(22) Filed: Nov. 10, 2016

(65) Prior Publication Data

US 2017/0056823 A1   Mar. 2, 2017

Related U.S. Application Data

(63) Continuation of application No. 13/202,830, filed as application No. PCT/US2010/025522 on Feb. 26, 2010, now Pat. No. 9,492,811.

(30) Foreign Application Priority Data

Feb. 27, 2009 (CN) .......................... 2009 1 0118672

(51) Int. Cl.
B01D 53/94 (2006.01)
B01J 23/00 (2006.01)
(Continued)

(52) U.S. Cl.
CPC ........ B01D 53/9418 (2013.01); B01J 23/002 (2013.01); B01J 23/30 (2013.01);
(Continued)

(58) Field of Classification Search
None
See application file for complete search history.

(56) References Cited

U.S. PATENT DOCUMENTS 552,128 A   12/1895  Hudson et al.
5,520,895 A   5/1996  Sharma et al.
(Continued)

FOREIGN PATENT DOCUMENTS

DE   19806062 A1   8/1999
WO   2006026067 A1   3/2006
(Continued)

OTHER PUBLICATIONS

"High OSC CeO2/ZrO2 Mixed Oxides Used as Preferred Metal Carriers for Advanced Catalysts"; Rohart et al; 2007-01-1057, SAE Technical Paper Series Advanced Catalysts and Substrates (2007): SAE International.
(Continued)

*Primary Examiner* — Colin W. Slifka

(57) ABSTRACT

Extruded honeycomb catalyst bodies and methods of manufacturing same. The catalyst body includes a first oxide selected from the group consisting of tungsten oxides, vanadium oxides, and combinations thereof, a second oxide selected from the group consisting of cerium oxides, lanthanum oxides, zirconium oxides, and combinations thereof, and a zeolite.

12 Claims, 3 Drawing Sheets

(51) Int. Cl.

| | |
|---|---|
| *B01J 23/30* | (2006.01) |
| *B01J 29/48* | (2006.01) |
| *B01J 29/076* | (2006.01) |
| *B01J 35/04* | (2006.01) |
| *B01J 37/00* | (2006.01) |
| *B01J 37/02* | (2006.01) |
| *B01J 37/04* | (2006.01) |
| *C04B 38/00* | (2006.01) |
| *C04B 111/00* | (2006.01) |

(52) U.S. Cl.
CPC ............ *B01J 29/076* (2013.01); *B01J 29/48* (2013.01); *B01J 35/04* (2013.01); *B01J 37/0009* (2013.01); *B01J 37/0244* (2013.01); *B01J 37/0246* (2013.01); *B01J 37/04* (2013.01); *C04B 38/0006* (2013.01); *B01D 2251/2067* (2013.01); *B01D 2255/2063* (2013.01); *B01D 2255/2065* (2013.01); *B01D 2255/20715* (2013.01); *B01D 2255/20723* (2013.01); *B01D 2255/20776* (2013.01); *B01D 2255/504* (2013.01); *B01D 2255/91* (2013.01); *B01D 2255/911* (2013.01); *B01J 2229/42* (2013.01); *B01J 2523/00* (2013.01); *C04B 2111/0081* (2013.01)

(56) References Cited

U.S. PATENT DOCUMENTS

| | | |
|---|---|---|
| 6,780,805 B2 | 8/2004 | Faber et al. |
| 2001/0002244 A1 | 5/2001 | Gieshoff et al. |
| 2002/0025905 A1 | 2/2002 | Harris et al. |
| 2002/0049137 A1 | 4/2002 | Morikawa et al. |
| 2003/0073566 A1 | 4/2003 | Marshall et al. |
| 2003/0167758 A1 | 9/2003 | Brown et al. |
| 2008/0286184 A1 | 11/2008 | Ando et al. |
| 2009/0084090 A1 | 4/2009 | Nakatsuji et al. |
| 2010/0058746 A1 | 3/2010 | Pfeifer et al. |
| 2010/0298131 A1 | 11/2010 | Ni et al. |

FOREIGN PATENT DOCUMENTS

| | | |
|---|---|---|
| WO | 2006109849 A1 | 10/2006 |
| WO | 2008101585 A1 | 8/2008 |
| WO | 2008150462 A2 | 12/2008 |

OTHER PUBLICATIONS

"Extruded Zeolite Catalysts for Lean Exhaust Application", Wusirika et al, 2005-01-1118; SAE Technical Paper Series, Advanced Catalyst and Susbtrates (2005) SAE International.

ZEOLITE AND REDOX OXIDE COMBINED CATALYST BODY

CROSS REFERENCE TO RELATED APPLICATION

This application is a continuation of U.S. patent application Ser. No. 13/202,830 filed on Oct. 11, 2011, which claims the benefit of priority under 35 U.S.C. § 365 of International Patent Application Serial No. PCT/US2010/025522 filed on Feb. 26, 2010, designating the United States of America, which in turn which also claims the benefit of priority to Chinese Patent Application No. 200910118672.1, filed on Feb. 27, 2009, the content of which is relied upon and incorporated herein by reference in its entirety.

FIELD

The present invention relates generally to catalysts and catalyst bodies, such extruded honeycomb catalyst bodies, such as for use in engine exhaust systems.

BACKGROUND

Various methods and devices are known for reducing emissions of engine exhaust, including catalyst supports or substrates.

SUMMARY

The present disclosure relates to catalysts and catalyst bodies, for example extruded honeycomb catalyst bodies, such as for use in engine exhaust systems, and their manufacture.

In one aspect, the present disclosure relates to a catalyst comprised of a first oxide selected from the group consisting of tungsten oxides, vanadium oxides, and combinations thereof, a second oxide selected from the group consisting of cerium oxides, lanthanum oxides, zirconium oxides, and combinations thereof, and a zeolite.

In another aspect, the present disclosure relates to catalyst structures comprised of a first oxide selected from the group consisting of tungsten oxides, vanadium oxides, and combinations thereof, a second oxide selected from the group consisting of cerium oxides, lanthanum oxides, zirconium oxides, and combinations thereof, and a zeolite. The catalyst structure can comprise a body such as an extruded honeycomb catalyst body. In at least some embodiments, the walls of the body are substantially comprised of a first oxide selected from the group consisting of tungsten oxides, vanadium oxides, and combinations thereof, a second oxide selected from the group consisting of cerium oxides, lanthanum oxides, zirconium oxides, and combinations thereof, and a zeolite. In some embodiments, the body comprises one or more layers, such as an external layer; in some of these embodiments, the layer can be the zeolite, or the layer can be a mixture of the first and second oxides, or a mixture of the first and second oxides and the zeolite; and the body may comprise an internal layer of zeolite, a mixture of the first and second oxides, or a mixture of the first and second oxides and the zeolite.

In one aspect, an extruded honeycomb catalyst body provided in accordance with the present disclosure may be comprised of the first oxide, the second oxide, and a zeolite. In one embodiment, an extruded honeycomb catalyst body provided in accordance with the present disclosure comprises zeolite and $WO_3$—$CeO_2$—$ZrO_2$.

In some embodiments, the extruded honeycomb catalyst bodies of the present disclosure provide a operating temperature window capable of exhibiting the reduction of nitrogen oxide ("$NO_x$") gas in which the temperature at the conversion site is 200° C. to 600° C. and higher.

In another aspect, the present disclosure is directed to a method of manufacturing an extruded honeycomb catalyst body comprised of the first and second oxides and the zeolite comprising the steps of (a) forming a mixture of zeolite with the first and second oxides and a binder, (b) extruding the mixture into a cellular body, and (c) firing the cellular body to produce an extruded catalyst body. In some embodiments, the cellular body, as well as the extruded catalyst body, is a honeycomb shaped body.

In another aspect, the present disclosure is directed to the use of a catalyst or catalytic structure in the treatment of engine exhaust.

Additional features and advantages of the present disclosure will be set forth in the detailed description which follows, and will be readily apparent to those skilled in the art from that description or recognized by practicing the subject matter as described herein, including the detailed description which follows, the claims, as well as the appended drawings.

It is to be understood that both the foregoing general description and the following detailed description are intended to provide an overview or framework for understanding the nature and character of the inventions as claimed. The accompanying drawings and figures are included to provide a further understanding of the disclosure, and are incorporated into and constitute a part of the specification. The figures illustrate various embodiments and aspects of the disclosure, and together with the description serve to explain the principles and operations of the claimed invention.

DETAILED DESCRIPTION

Figure 1:
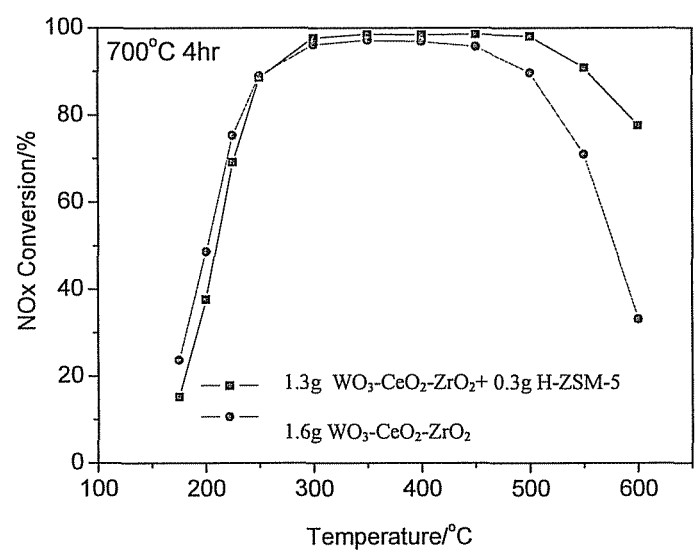
FIG. 1 is a graphic illustration comparing $NO_x$ gas conversion for pelletized catalyst of $WO_3$—$CeO_2$—$ZrO_2$ and pelletized catalyst of $WO_3$—$CeO_2$—$ZrO_2$ mixed with H-ZSM-5 zeolite, as a function of inlet gas temperature.

Reference will now be made in detail to the embodiments of the disclosure, examples and aspects of which are illustrated in the accompanying figures.

In one illustrative embodiment, an extruded honeycomb catalyst body (the "catalyst body") is provided by mixing zeolite with first and second oxides and a binder, the first oxide being selected from the group consisting of tungsten oxides, vanadium oxides, and combinations thereof, and the second oxide being selected from the group consisting of cerium oxides, lanthanum oxides, zirconium oxides, and combinations thereof. The mixed composition can be extruded to form cellular bodies, such as having honeycomb structures, which can be referred to as green bodies, that are then fired to create the catalyst body. In some embodiments, the catalyst body is especially suited in applications for treating engine exhaust streams such as diesel and lean burning engine exhaust containing $NO_x$, HC and ammonia gas.

The first and second oxides and zeolite are stable at automobile exhaust temperatures, exhibit selective catalytic reduction ("SCR"), and can be used with urea injection. These catalysts have $NH_3$ adsorption, $NO_x$ adsorption, and $NO_x$ oxidation sites for optimum $NO_x$ reduction performance. Adsorbed $NH_3$ on the surface interacts with adjacent adsorbed $NO_x$. The $NO_x$ is accordingly reduced to nitrogen and $H_2O$. The zeolite and the first and second oxides exhibit SCR activity of $NO_x$, however, in different temperature ranges. The zeolite (e.g. H-ZSM-5) converts a substantial percentage of $NO_x$ at a higher temperature region (e.g. above 400° C., or 500° C., or even 600° C.) while the first and second oxides convert a substantial percentage of $NO_x$ at a lower temperature region (e.g. below 350° C., or 300° C., or even 250° C.). In another aspect, the HC and ammonia gases are also catalytically reduced by the catalyst body.

Combining zeolite with the first and second oxides widens the effective $NO_x$ conversion or reducing temperature window. At least certain embodiments have exhibited an operating temperature window of 200° C. to 600° C. for the effective reduction of $NO_x$ gas. In contrast, the lower temperature conversion window limit of HZSM-5 zeolite alone is approximately 325° C. Extending the lower window conversion temperature limit may be particularly advantageous for treating engine exhaust such as diesel exhaust gas.

The first and second oxides typically have high surface area (ranging from 20 m²/g to 200 m²/g). One exemplary redox oxide containing both first and second oxides is represented by composition as $WO_3$—$CeO_2$—$ZrO_2$.

Exemplary zeolites include ZSM-5, Beta, Mordenite, Y-zeolite, Ultrastable-Y and aluminum phosphate zeolites, and mixtures thereof. One source of ZSM-5 zeolite is supplied by Zeolyst International of Valley Forge, Pa., USA. In some embodiments, the zeolite material can have a pore diameter ranging from 0.5 nm to 0.7 nm. In some embodiments, the zeolite has a Si/Al ratio of 15 to 100, or in other embodiments 15 to 50, or in other embodiments 15 to 30. In one set of embodiments of the present disclosure, a NOx reducing catalyst is comprised of a first oxide selected from the group consisting of tungsten oxides, vanadium oxides, and combinations thereof, a second oxide selected from the group consisting of cerium oxides, lanthanum oxides, zirconium oxides, and combinations thereof, and a zeolite. In some embodiments, the catalyst comprises an oxide of Ce, an oxide of W, an oxide of La, or mixtures thereof. In some embodiments, the catalyst comprises an oxide of Zr. In some embodiments, the catalyst comprises an oxide of Ce. In some embodiments, the catalyst comprises an oxide of W. In some embodiments, the catalyst comprises $WO_3$—$CeO_2$—$ZrO_2$. In some embodiments, the catalyst comprises an oxide of W and an oxide of Ce. In some embodiments, the catalyst comprises an oxide of Zr, an oxide of W, and an oxide of Ce.

In some embodiments, the catalyst comprises an oxide of W, an oxide of Ce, or a mixture thereof.

In some embodiments, the catalyst reduces NOx gas by at least 30% at a temperature of 200° C. or more. In some of these embodiments, the catalyst reduces NOx gas by at least 30% at a temperature of 200° C. to 600° C.

In some embodiments, at least part of the catalyst is in the form of a honeycomb body comprising a matrix of walls.

In some embodiments, the zeolite is selected from the group consisting of ZSM-5, beta-zeolites, mordenite, Y-zeolites, ultrastabilized Y-zeolites, aluminum phosphate zeolites, and mixtures thereof.

In another set of embodiments of the present disclosure, a catalytic structure is comprised of a first oxide selected from the group consisting of tungsten oxides, vanadium oxides, and combinations thereof, a second oxide selected from the group consisting of cerium oxides, lanthanum oxides, zirconium oxides, and combinations thereof, and a zeolite. In some embodiments, the catalytic structure is substantially free of platinum, palladium, and rhodium.

In some embodiments, the structure comprises a body having a plurality of walls defining a plurality of parallel channels. In some embodiments, the body is honeycomb shaped.

In some embodiments, the body comprises an external layer comprised of a mixture of the first and second oxides; in some of these embodiments, the external layer is comprised of a tungsten oxide, a cerium oxide and a zirconium oxide; in other embodiments, the body comprises an external layer comprised of the zeolite.

In some embodiments, the walls of the body are substantially comprised of the zeolite. In some of these embodiments, the walls of the core are coated with a layer of a mixture of a cerium oxide, a zirconium oxide, and a tungsten oxide.

In some embodiments, the walls of the body are substantially comprised of a mixture of the first and second oxides and the zeolite. In some of these embodiments, the walls of the body are formed from extrusion of the mixture.

In some embodiments, the walls of the body are comprised of ceramic, metal, or a combination thereof; in some of these embodiments, the walls of the body are coated with a layer of the zeolite and a layer of a mixture of a cerium oxide, a zirconium oxide, and a tungsten oxide; in some of these embodiments, the layer of zeolite forms an external coating on the walls of the core. In some embodiments, the layer of the mixture forms an external layer on the walls of the core.

In some embodiments, the body is comprised of ceramic or metal. In some of these embodiments, the body comprises ceramic comprised of cordierite, aluminum titanate, mullite, silicon carbide, silicon nitride, or mixtures thereof.

In some embodiments, the structure comprises a tungsten oxide. In some embodiments, the structure comprises an oxide of Zr. In some embodiments, the structure comprises an oxide of Ce. In some embodiments, the structure comprises a cerium oxide, a zirconium oxide, or a combination thereof. In some embodiments, the structure comprises a tungsten oxide and a cerium oxide. In some embodiments, the structure comprises a tungsten oxide, a cerium oxide, and a zirconium oxide. In some embodiments, the structure comprises $WO_3$—$CeO_2$—$ZrO_2$.

In some embodiments, the zeolite is selected from the group consisting of ZSM-5, beta-zeolites, mordenite, Y-zeolites, ultrastabilized Y-zeolites, aluminum phosphate zeolites and mixtures thereof.

In some embodiments, the use of such catalytic structure comprises contacting an exhaust stream containing NOx gas. In some embodiments, the temperature of the exhaust stream is less than 200° C. and the NOx gas is catalytically reduced by contact with the structure; in some of these embodiments, the NOx gas is reduced by more than 30%, more than 40%, or even more than 50%. In some embodiments, the temperature of the exhaust stream is greater than 600° C. and the NOx gas is catalytically reduced by contact with the structure. In some embodiments, the exhaust stream comprises a reductant (such as ammonia gas or urea) and the reductant is catalytically activated by contact with the structure.

In another set of embodiments of the present disclosure, a catalyst is comprised of a first oxide selected from the group consisting of tungsten oxides, vanadium oxides, and combinations thereof, a second oxide selected from the group consisting of cerium oxides, lanthanum oxides, zirconium oxides, and combinations thereof, and a zeolite, wherein the catalyst is capable of reducing NOx gas by at least 30%, in which the temperature of NOx reduction at the conversion site is 200° C. to 600° C. In some embodiments, the catalyst comprises an oxide of Ce, an oxide of Zr, and an oxide of W. In some embodiments, the catalyst is formed as an extruded honeycomb body comprising a matrix of walls. In some embodiments, the catalyst comprises $WO_3$—$CeO_2$—$ZrO_2$. In some embodiments, the zeolite is selected from the group consisting of ZSM-5, beta-zeolites, mordenite, Y-zeolites, ultrastabilized Y-zeolites, aluminum phosphate zeolites, and mixtures thereof.

The disclosure may be further understood by reference to the following examples, which are intended to be merely illustrative of the compositions and methods for carrying out the invention.

The catalyst of the present disclosure can be prepared by various procedures, such as coprecipitation (Cop), solution combustion synthesis (SCS), or physical mixing. The catalyst (or catalyst system) can be prepared and its SCR activity (NOx conversion) measured.

FIG. 1 shows the NOx conversion at different reaction temperatures for 1.6 g $WO_3$—$CeO_2$—$ZrO_2$ (Cop) (alone) and for 1.3 g $WO_3$—$CeO_2$—$ZrO_2$ (Cop), physically mixed with 0.3 g H-ZSM-5 (Si/Al=17.6, manufactured by Nankai University, Tianjin, China). The reaction conditions were: 1 m/catalyst, [NO]=[NH$_3$]=550 ppm, [O$_2$]=6%, [CO$_2$]=10%, [H$_2$O]=10%, N$_2$=balance, total flow rate=1500 ml/min. It was found that with the addition of about 25 wt % H-ZSM-5, the high-temperature DeNOx efficiency of $WO_3$—$CeO_2$—$ZrO_2$ (Cop) catalyst was improved significantly (NOx conversion at 600° C. increased from 30% to 78%), with substantially the same (only a very small decrease shown in FIG. 1) in the low-temperature DeNOx efficiency. Both catalysts (with and without zeolite ZSM-5) were aged at 700° C. for 4 hours.

Figure 2A:
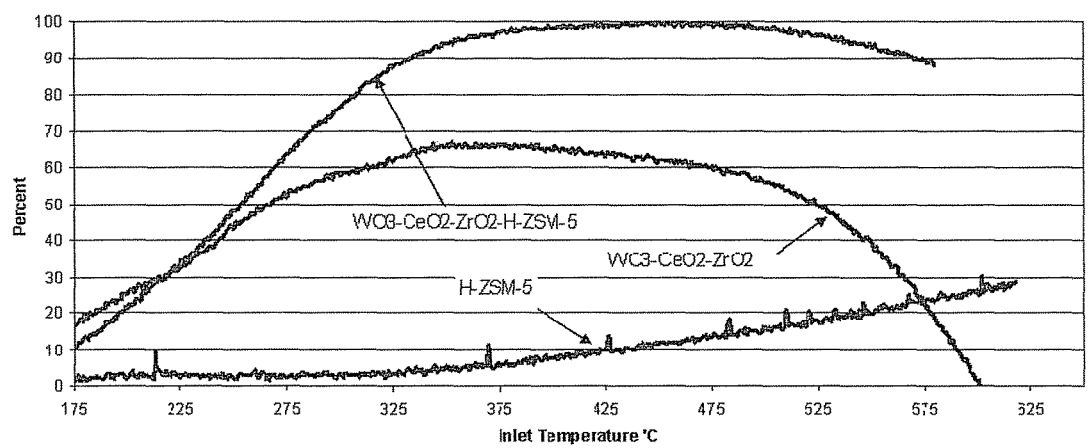
FIG. 2A is a graphic illustration of a comparison of the NOx conversion (in %) from an extruded honeycomb made from H-ZSM-5 zeolite (alone), $WO_3$—$CeO_2$—$ZrO_2$ alone plus alumina as a filler, and a mixture of H-ZSM-5 zeolite and $WO_3$—$CeO_2$—$ZrO_2$ at various gas stream temperatures at the inlet to the catalysts, wherein each catalyst was not aged.
Figure 2B:
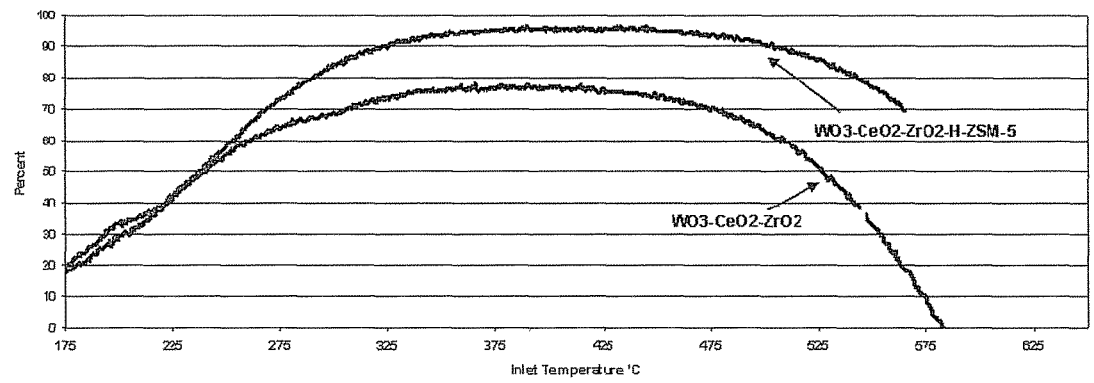
FIG. 2B is a graphic illustration of NOx conversion (in %) for the extruded honeycomb of $WO_3$—$CeO_2$—$ZrO_2$ alone plus alumina as a filler, and the extruded honeycomb of a mixture of H-ZSM-5 zeolite and $WO_3$—$CeO_2$—$ZrO_2$ both aged for 64 hours at 700° C. in 10% steam.

FIG. 2A shows a comparison of the NOx conversion (in %) from an extruded honeycomb made from H-ZSM-5 zeolite (alone), $WO_3$—$CeO_2$—$ZrO_2$ alone plus alumina as a filler, and a mixture of H-ZSM-5 zeolite and $WO_3$—$CeO_2$—$ZrO_2$, at various gas stream temperatures at the inlet to the catalysts, wherein each catalyst was not aged. FIG. 2B shows NOx conversion (in %) for the extruded honeycomb of $WO_3$—$CeO_2$—$ZrO_2$ alone plus alumina as a filler, and the extruded honeycomb of a mixture of H-ZSM-5 zeolite and $WO_3$—$CeO_2$—$ZrO_2$, both aged for 64 hours at 700° C. in 10% steam. FIGS. 2A & 2B show the synergistic effect of the mixture of zeolite and $WO_3$—$CeO_2$—$ZrO_2$ which is not found with either of those components alone. Unless otherwise noted, for the extruded honeycomb bodies tested herein, the following conditions applied: 1 inch diameter×1 inch long honeycombs were produced, and tested at a space velocity of 20,000 h$^{-1}$, with gas flow of 10% O$_2$, 500 ppm NO, 500 ppm NH3, 5% H$_2$O, and the balance N$_2$.

Figure 3:
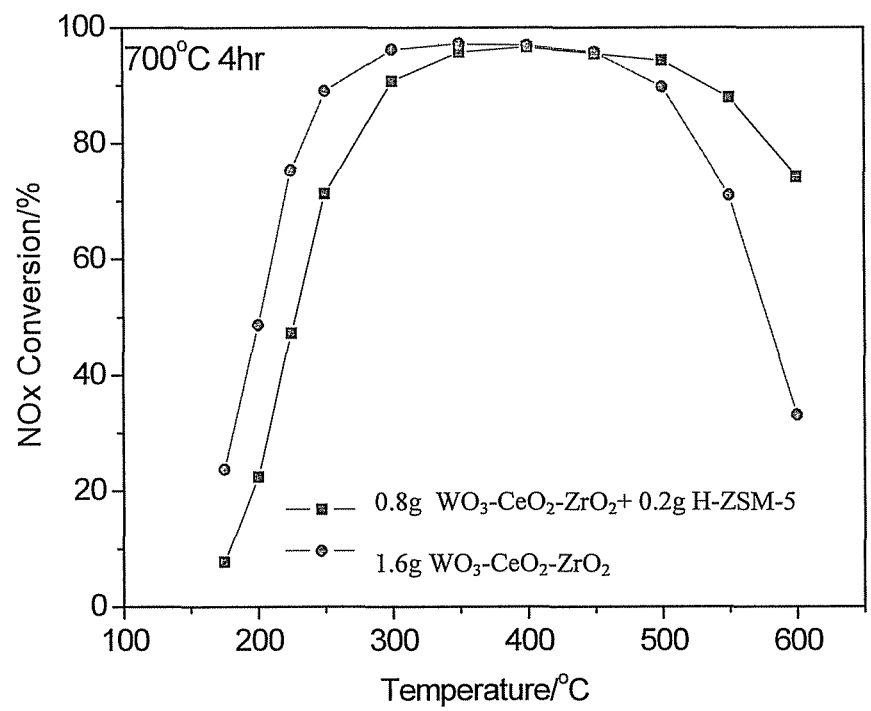
FIG. 3 is a graphic illustration of $NO_x$ gas conversion for pellets made from 1.6 g $WO_3$—$CeO_2$—$ZrO_2$ (alone) and for 0.8 g $WO_3$—$CeO_2$—$ZrO_2$, physically mixed with 0.2 g H-ZSM-5, both pellet sets aged at 700° C. for 4 hours.

FIG. 3 shows the NOx conversion at different reaction temperatures for 1.6 g $WO_3$—$CeO_2$—$ZrO_2$ (Cop) (alone) and for 0.8 g $WO_3$—$CeO_2$—$ZrO_2$ (Cop), physically mixed with 0.2 g H-ZSM-5, both samples aged at 700° C. for 4 hours.

Figure 4:
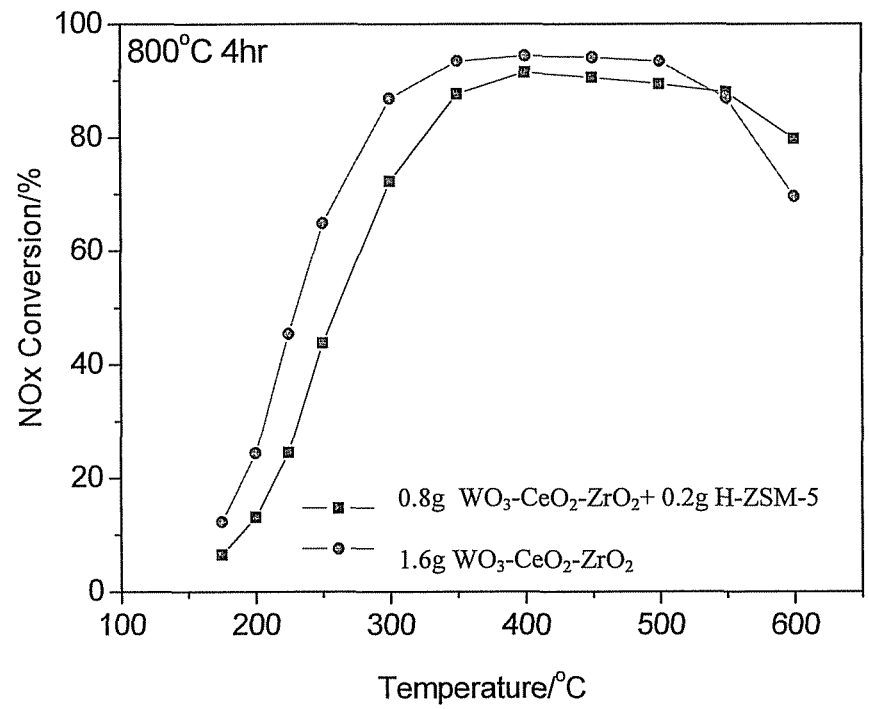
FIG. 4 shows the NOx conversion at different reaction temperatures for the pellet sets of FIG. 3, wherein both pellet sets were aged at 800° C. for 4 hours.

FIG. 4 shows the NOx conversion at different reaction temperatures for the pellet sets of FIG. 3, wherein both pellet sets were aged at 800° C. for 4 hours. The ceria:zirconia ratio in the above example embodiments was 1:1, in other embodiments, the ceria:zirconia ratio could be in the range of 1:1 to 1:2, inclusive.

Additional examples of the catalyst body's composition are contained in Table 1 below. The zeolite had a Si/Al ratio of 60. Each body may contain other non-reactive fillers and binders (as superadditions).

TABLE 1

| ID | $WO_3$ (9.1% wt) on $CeO_2$—$ZrO_2$ (1:1) | Zeolite % | Alumina | Sample Wt (g) | Cells per square inch/web thickness |
|---|---|---|---|---|---|
| 1 | — | 100 | — | 3.44 | 200/12 |
| 2 | 60 | — | 40 | 12.53 | 400/7 |
| 3 | 60 | 40 | — | 7.15 | 400/7 |

The firing procedure for firing the green bodies can be achieved with known ovens, such as periodic (or batch wise) ovens, or kilns, such as tunnel kilns that employ one or more conveyors. In some embodiments, the green bodies can be dried to remove water via microwave or conventional oven wherein the green body is heated to temperatures between 60 to 100° C. In some embodiments, the green structures are fired by exposing the green structures to a heated gaseous environment, such as air, wherein the air is heated to temperatures in the range of about 100° C.-1200° C., and in some of these embodiments between about 500° C.-900° C., with a residence time in that temperature range of a duration sufficient to complete firing of the body. The residence time can be about 1 to 48 hours, in some embodiments from 1 to 10 hours, and in some embodiments from 3 to 6 hours, and may depend, for example, on the type or source of components employed.

In another embodiment, the catalyst body is formed with one or more layers of zeolite and one or more layers of a redox oxide. In one embodiment, the combined zeolite and redox oxide compositions described above are also used in combination with these one or more layers. In a particular embodiment, the zeolite or redox oxide or both are also added as a washcoating layer to the body.

The catalyst bodies are produced by mixing batch materials, blending the mixture, forming a green body, and subsequently sintering or firing the green body to a hard porous structure. A batch mixture suitable for extrusion can be prepared by mixing the components described above with a suitable liquid vehicle. The vehicle may comprise water and extrusion aids necessary to give the batch plastic formability and sufficient green strength after forming to resist breakage prior to firing. Various lubricants, binders, surfactants, and viscosity modifiers can be added to the batch during the mixing step to provide viscosity control, plasticity, and strength prior to firing, to the fired structure.

The binder component holds the body together to achieve strong mechanical structure for the body. Suitable binder materials include silica or silica forming materials. Mixtures or combinations of binder materials may also be used. The binder is preferably selected from silicone binding agents such as silicone resins and/or emulsions. These can be provided as precursors, for example, silica precursors such as silicone resin, or colloidal silica are suitable. Preferably, the binder is incorporated in the form of a silicone resin or silicone emulsion. Silicone resins can be added to the mixture in the form of an aqueous emulsion, and are commercially available, such as Wacker AG SILRES® M 50 E (an emulsion of a methyl silicone resin with reported solids content of 52%-55%) or Wacker AG SILRES® M 97 E, both available from Wacker-Chemie GmbH of Munich, Germany. In some embodiments, the binder is incorporated in the batch mixtures such that the fired ceramic contains silica binder in an amount ranging from about 5% to about 30% by weight, preferably 15%-30%, and more preferably about 20%. The amounts of the binders are based on the expected weight after heat-treatment which will be the weight of the binder in the product body. For example, when silicone resins are used the weight of the binder in the product is the weight of silica added via the resins. During firing, silica, which may be provided in the form of one or more silica forming materials or in the form of silica itself, softens and propagates throughout the body. Upon cooling after firing, the silica hardens and serves as a binder for the other materials that make up the body.

The extrusion aids will normally comprise both binders and plasticizers/paste formers, as well as processing aids such as lubricants. The plasticizers/paste formers provide plasticity during forming, and some strength to the extruded body prior to firing. Organic pastes suitable for the purposes set forth herein include cellulose ether type materials and/or their derivatives. Sources of cellulose ethers and/or derivatives thereof include the Methocel™ line of cellulose ethers, from Dow Chemical Co., and mixtures thereof. Methylcellulose is an example of an organic paste forming agent suitable for use in formulating the extruded bodies of the present disclosure. The binder, organic paste and other processing aids are generally added as a super addition over the combined weight of the primary phase and secondary phase (based on expected weight after heat treatment). The super addition of organic paste is generally in the range of about 3%-8%, but more or less may be utilized. The organic paste or temporary binder material is substantially burned off during the subsequent firing of the honeycomb body. Water may be added to the batch components to achieve the necessary plasticity for handling and extrusion. Water-based binders can be used for ease of processing in this regard.

One method of forming the honeycomb structure is by extrusion through a forming die. A ram extruder, continuous auger, or twin screw extruder or other known extrusion apparatus can be used. The honeycomb body according to the present disclosure can have any convenient size and shape, for example, a right circular cylindrical shape structure. The honeycomb body can be extruded to form a matrix of walls wherein the primary phase material(s), secondary phase material(s) (if present) and permanent binder are generally homogenously distributed throughout the walls. The matrix of walls define channels extending through the honeycomb body. The honeycomb body can be further coated with a skin cement material at the outer periphery of the structure.

In some embodiments, the catalyst body can have an improved thermo-mechanical durability and improved thermal shock resistance due to a net balance or lowering of the coefficient of thermal expansion ("CTE") resulting from the mixture of zeolite with the first and second oxides. Thermal shock resistance depends on the CTE. The closer the CTE is to zero, the more thermally shock resistant is the material. Zeolites typically have low or negative CTEs, that is, a CTE of $-20 \times 10^{-7}/°$ C., or even lower over their useful stable temperature ranges. The redox oxides typically have higher CTE than the zeolite. The catalyst body has a higher CTE than a body made from zeolite materials not combined with redox oxides. The redox oxide having a positive CTE balances the negative CTE of the zeolite. Thus, the present disclosure potentially provides thermally shock resistant zeolite-based honeycomb bodies and methods of making them.

Embodiments of the extruded and fired honeycomb bodies of the present disclosure can be particularly suited for use with engine exhaust systems as flow through substrates. In some embodiments, the provided body is also washcoated with a catalyst material. However, the honeycomb bodies of the present disclosure preferably exhibit high surface area and low thermal expansion, and in some embodiments reduce or eliminate the need for excessive high surface area washcoating.

In some embodiments, the honeycomb body is a flow through substrate.

It will be apparent to those skilled in the art that various modifications and variations can be made to the present disclosure without departing from the spirit and scope of the invention. Thus it is intended that the present invention cover the modifications and variations of this disclosure provided they come within the scope of the appended claims and their equivalents.

What is claimed:

1. A method for treating an exhaust stream containing $NO_x$ gas comprising contacting a catalytic structure with the exhaust stream, the catalytic structure comprising a first oxide selected from the group consisting of tungsten oxides and vanadium oxides, a second oxide selected from the group consisting of cerium oxides, lanthanum oxides, zirconium oxides, and combinations thereof, and a zeolite, the method further comprising contacting the catalytic structure with the exhaust stream containing $NO_x$ gas, wherein the catalytic structure is substantially free of platinum, palladium, and rhodium, and wherein an external layer of the catalytic structure comprises a mixture of the first oxide and the second oxide without the zeolite on a layer comprising the zeolite.

2. The method of claim 1 wherein the temperature of the exhaust stream is less than 200° C. and the $NO_x$ gas is catalytically reduced by contact with the structure.

3. The method of claim 1 wherein the temperature of the exhaust stream is greater than 600° C. and the $NO_x$ gas is catalytically reduced by contact with the structure.

4. The method of claim 1 wherein the exhaust stream comprises a reductant and the reductant is catalytically activated by contact with the structure.

5. The method of claim 1 wherein the catalytic structure comprises: a first oxide of $WO_3$; a second oxide of $CeO_2$—$ZrO_2$; and the zeolite.

6. The method of claim 5 wherein the catalytic structure comprises $WO_3$—$CeO_2$—$ZrO_2$.

7. The method of claim 5, said catalytic structure comprising a body comprising about 60% to about 81% of $WO_3$—$CeO_2$—$ZrO_2$ and about 25% to about 40% of a ZSM-5 zeolite.

8. The method according to claim 1 wherein the temperature of the exhaust stream is less than 200° C. and the $NO_x$ gas is catalytically reduced by contact with the structure.

9. The method according to claim 1 wherein the temperature of the exhaust stream is greater than 600° C. and the $NO_x$ gas is catalytically reduced by contact with the structure.

10. The method according to claim 1 wherein the exhaust stream comprises a reductant and the reductant is catalytically activated by contact with the catalytic structure.

11. The method of claim 1 wherein the zeolite comprises ZSM-5.

12. The method of claim 1, wherein the zeolite converts a substantial percentage of the $NO_x$ above 400° C. and the first and second oxides convert a substantial percentage of the $NO_x$ below 350° C.

\* \* \* \* \*

UNITED STATES PATENT AND TRADEMARK OFFICE
CERTIFICATE OF CORRECTION

PATENT NO.        : 10,188,985 B2
APPLICATION NO.   : 15/348415
DATED             : January 29, 2019
INVENTOR(S)       : Steven Bolaji Ogunwumi et al.

Page 1 of 1

It is certified that error appears in the above-identified patent and that said Letters Patent is hereby corrected as shown below:

On the Title Page

On page 2, in Column 2, item (56), Other Publications, Line 3, delete "Susbtrates" and insert -- Substrates --, therefor.

Signed and Sealed this
Twenty-fifth Day of February, 2020

Andrei Iancu
*Director of the United States Patent and Trademark Office*